(12) United States Patent
Narayanan et al.

(10) Patent No.: US 8,607,051 B2
(45) Date of Patent: Dec. 10, 2013

(54) METHOD AND APPARATUS FOR BINDING MULTIPLE AUTHENTICATIONS

(75) Inventors: Vidya Narayanan, San Diego, CA (US); Lakshminath Reddy Dondeti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1101 days.

(21) Appl. No.: 11/733,414

(22) Filed: Apr. 10, 2007

(65) Prior Publication Data

US 2008/0040606 A1    Feb. 14, 2008

Related U.S. Application Data

(60) Provisional application No. 60/791,321, filed on Apr. 11, 2006.

(51) Int. Cl.
*H04L 9/32* (2006.01)

(52) U.S. Cl.
USPC .......................................................... 713/169

(58) Field of Classification Search
None
See application file for complete search history.

(56) References Cited

U.S. PATENT DOCUMENTS

| | | | | |
|---|---|---|---|---|
| 7,509,491 | B1 * | 3/2009 | Wainner et al. | 713/163 |
| 7,596,690 | B2 * | 9/2009 | Singh | 713/151 |
| 8,006,089 | B2 * | 8/2011 | Ohba | 713/168 |
| 8,239,671 | B2 * | 8/2012 | Oba | 713/155 |
| 8,359,397 | B2 * | 1/2013 | Traversat et al. | 709/230 |
| 2005/0015490 | A1 * | 1/2005 | Saare et al. | 709/225 |
| 2006/0002557 | A1 | 1/2006 | Madour | |
| 2006/0117104 | A1 * | 6/2006 | Taniguchi et al. | 709/225 |
| 2006/0200670 | A1 * | 9/2006 | Kuffel et al. | 713/170 |

FOREIGN PATENT DOCUMENTS

| | | |
|---|---|---|
| JP | 2001326632 A | 11/2001 |
| JP | 2002335239 A | 11/2002 |
| JP | 2003295963 A | 10/2003 |

OTHER PUBLICATIONS

Josephson, William, et al., "Peer-to-Peer Authentication with a Distributed Single Sign-On Service" International Workshop on Peer-to-Peer Systems, Feb. 26, 2004, pp. 1-6.
International Search Report—PCT/US07/066344, International Search Authority—European Patent Office—Oct. 8, 2007.
Written Opinion—PCT/US07/066344, International Search Authority, European Patent Office, Oct. 8, 2007.
Taiwan Search Report—TW096112826—TIPO—Dec. 13, 2011.

* cited by examiner

*Primary Examiner* — Fikremariam A Yalew
(74) *Attorney, Agent, or Firm* — Won Tae Kim

(57) ABSTRACT

Techniques for binding multiple authentications for a peer are described. In one design, multiple authentications for the peer may be bound based on a unique identifier for the peer. The unique identifier may be a pseudo-random number and may be exchanged securely between the peer, an authentication server, and an authenticator in order to prevent a man-in-the-middle attack. Data for all authentications bound by the unique identifier may be exchanged securely based on one or more cryptographic keys generated by all or a subset of these authentications. In another design, multiple levels of security may be used for multiple authentications for a peer. The peer may perform a first authentication with a first authentication server and obtain a first cryptographic key and may also perform a second authentication with the first authentication server or a second authentication server and obtain a second cryptographic key. The peer may thereafter securely exchange data using the two keys using nested security.

44 Claims, 7 Drawing Sheets

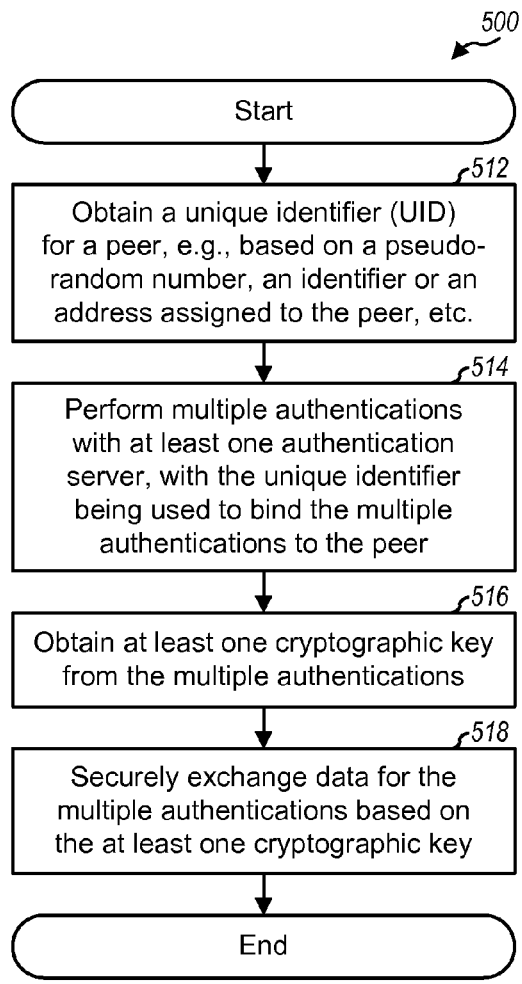
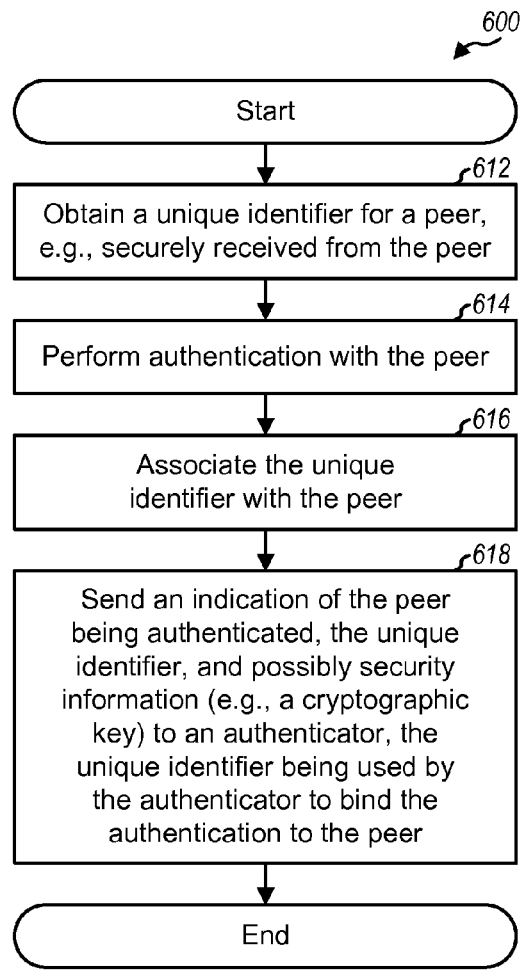
FIG. 5
FIG. 6

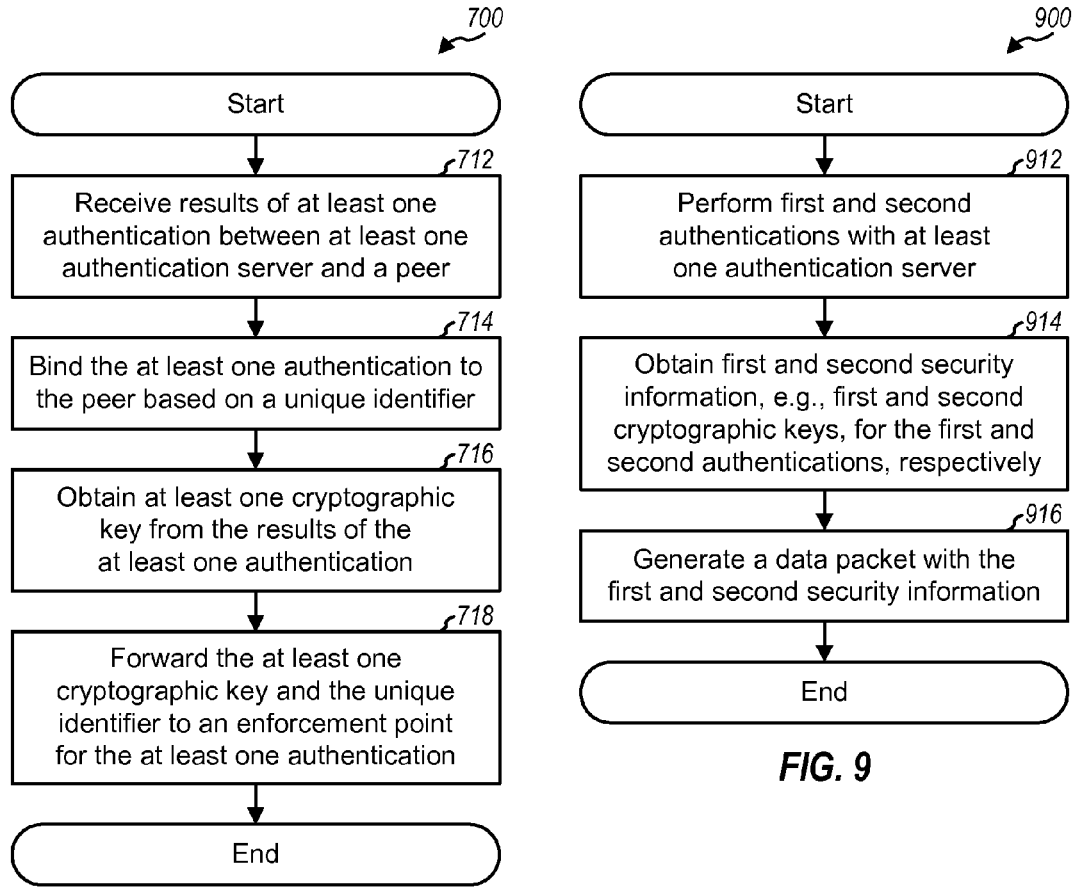
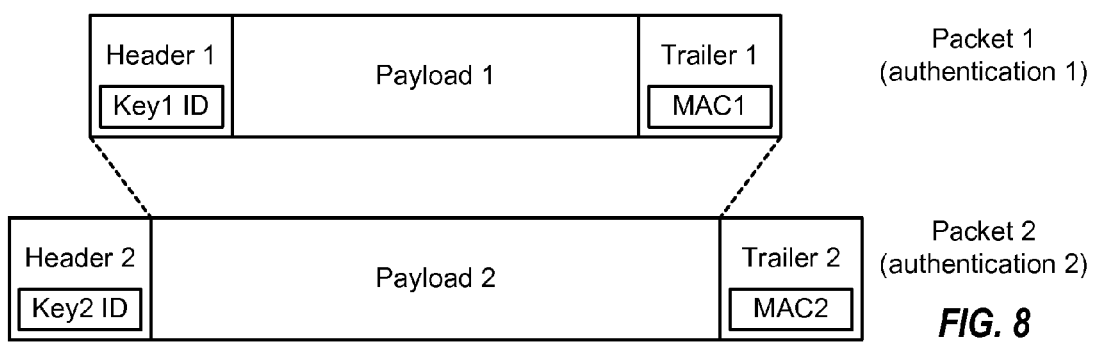

US 8,607,051 B2

METHOD AND APPARATUS FOR BINDING MULTIPLE AUTHENTICATIONS

CLAIM OF PRIORITY UNDER 35 U.S.C. §119

The present Application for patent claims priority to Provisional Application Ser. No. 60/791,321, entitled "METHOD AND APPARATUS FOR BINDING MULTIPLE AUTHENTICATIONS," filed Apr. 11, 2006, assigned to the assignee hereof, and expressly incorporated herein by reference.

BACKGROUND

1. Field

The present disclosure relates generally to communication, and more specifically to techniques for binding authentications.

2. Background

Authentication is widely used to determine the true identity of a given entity, to determine whether the entity is entitled to receive a particular service, and/or for other purposes. For example, a terminal may attempt to establish communication with a wireless communication network in order to obtain a data service, e.g., Voice-over-Internet Protocol (VoIP). The identity of the terminal may be authenticated by an authentication server for the wireless network to ensure that the terminal can communicate with the network. The terminal may also be authenticated by the same or different authentication server to ensure that the terminal has proper subscription and can receive the requested data service.

Authentication may be performed by sending secure information from one entity and verifying this information by another entity. To prevent fraudulent attack, the secure information may be generated based on secret information (e.g., a cryptographic key) that is known only to these two entities. The secure information may be encrypted data, a message authentication code, or some other information generated based on a cryptographic technique using the secret information.

The terminal may perform multiple authentications either sequentially or in parallel. The terminal may perform one authentication for system access and another authentication for service request. The terminal may also perform device authentication to verify the terminal and user authentication to verify a user of the terminal. It is desirable to perform the multiple authentications in a manner such that these authentications may be tied together, if appropriate.

SUMMARY

Techniques for binding multiple authentications for a peer are described herein. The peer may perform multiple authentications with one or more authentication servers, which may forward the results of the authentications to one or more authenticators. An authenticator is an entity that initiates and/or facilitates authentication and is typically located at the edge of a communication network. A peer is an entity that responds to an authenticator. An authentication server is an entity that provides authentication service to an authenticator.

In one design, multiple authentications for the peer may be bound based on a unique identifier (UID) for the peer. The unique identifier may be a pseudo-random number and may be exchanged securely between the peer, an authentication server, and an authenticator in order to prevent man-in-the-middle (MiTM) attack. Data for all authentications bound by the unique identifier may be exchanged securely based on one or more cryptographic keys generated by all or a subset of these authentications.

According to an aspect, an apparatus for a peer obtains a unique identifier for the peer and performs multiple authentications with at least one authentication server. The unique identifier is used to bind the multiple authentications to the peer.

According to another aspect, an apparatus for an authentication server obtains a unique identifier for a peer, performs authentication with the peer, and associates the unique identifier with the peer.

According to yet another aspect, an apparatus for an authenticator receives results of at least one authentication between at least one authentication server and a peer. The apparatus binds the at least one authentication to the peer based on a unique identifier.

In another design, multiple levels of security (or nested security) may be used for multiple authentications for a peer. The peer may perform a first authentication with a first authentication server and obtain a first cryptographic key. The peer may also perform a second authentication with a second authentication server and obtain a second cryptographic key. The peer may thereafter securely exchange data using the two keys.

According to yet another aspect, an apparatus is described which generates a first packet for data in accordance with first security information obtained from a first authentication, generates a second packet carrying the first packet in accordance with second security information obtained from a second authentication, and sends the second packet.

Various designs, aspects and features of the disclosure are described in further detail below.

BRIEF DESCRIPTION OF THE DRAWINGS

FIGS. 5, 6 and 7 show processes performed by a peer, an authentication server, and an authenticator, respectively, for multiple authentications with a unique identifier.

FIG. 8 shows nested security for two authentications.

FIG. 9 shows a process for multiple authentications with nested security.

DETAILED DESCRIPTION

The techniques described herein may be used for various communication networks such as wide area networks (WANs), local area networks (LANs), wireless WANs (WWANs), wireless LANs (WLANs), etc. The terms "networks" and "systems" are often used interchangeably. The WWANs may be Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network may implement a radio technology such as Wideband-CDMA (W-CDMA), cdma2000, etc. cdma2000 covers IS-2000, IS-95 and IS-856 standards. A TDMA network may implement a radio technology such as Global System for Mobile Communications (GSM). The WLANs may implement IEEE 802.11, Hiperlan, etc. These various radio technologies and standards are known in the art. For clarity, certain aspects of the techniques are described using terminology defined in RFC 3748, entitled "Extensible Authentication Protocol (EAP)," June 2004, which is publicly available.

Figure 1:
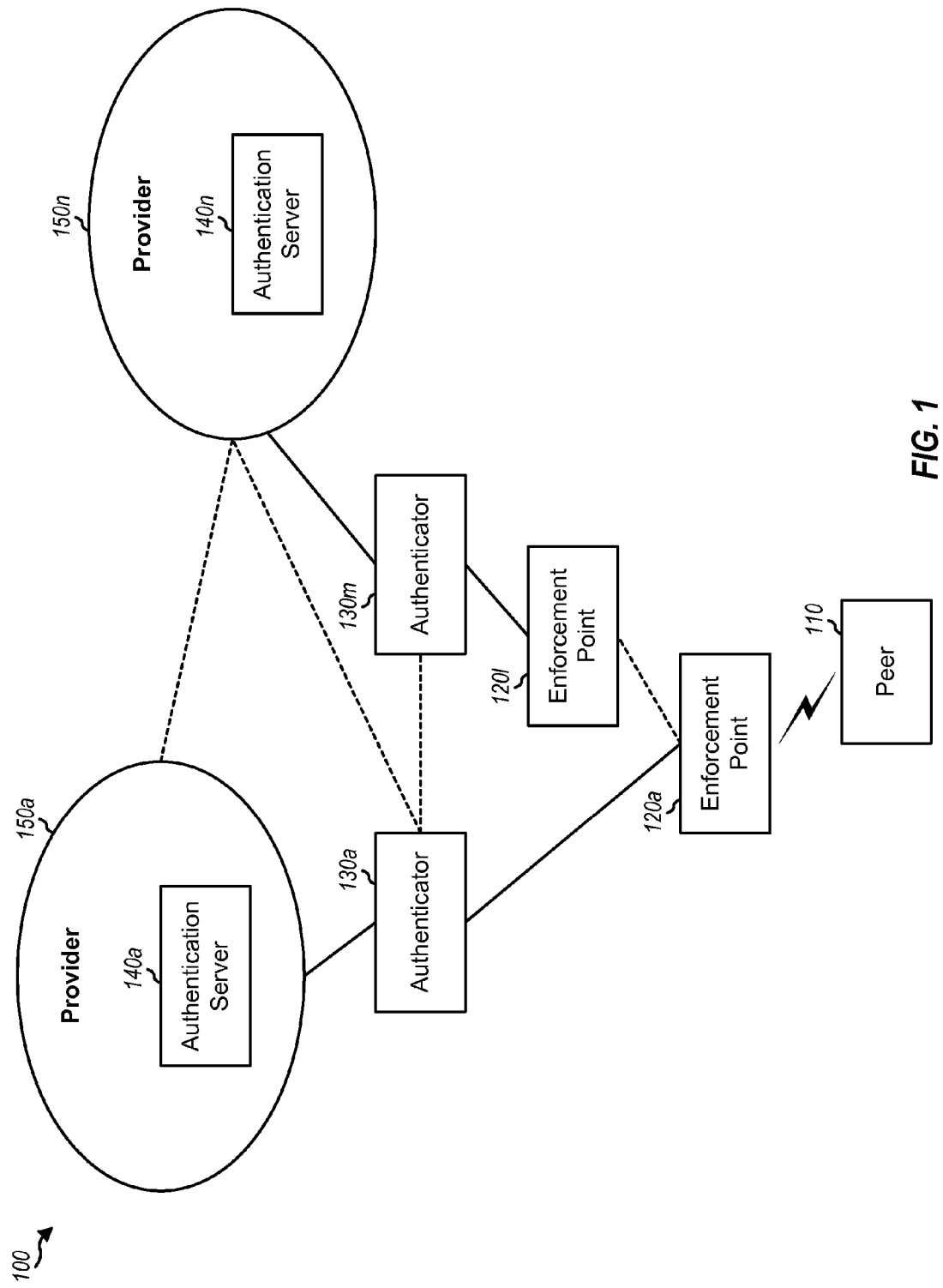
FIG. 1 shows an architecture for multiple authentications.

FIG. 1 shows a deployment 100 in which a peer 110 may perform multiple authentications. For simplicity, only logical entities related to authentication are shown in FIG. 1. A deployment may include other network entities not shown in FIG. 1.

Peer 110 may be any device such as a cellular phone, a personal digital assistant (PDA), a wireless communication device, a handheld device, a wireless modem, a laptop computer, a cordless phone, etc. Peer 110 may also be referred to as a mobile station, a station, a user equipment, a terminal, an access terminal, a subscriber unit, a mobile equipment, etc.

In the example shown in FIG. 1, the network side includes L enforcement points 120a through 120l, M authenticators 130a through 130m, and N authentication servers 140a through 140n for N providers 150a through 150n, where in general L≥1, M≥1, and N≥1. Peer 110 may communicate with enforcement point 122a. Each enforcement point 120 may communicate with one or more other enforcement points 120 and/or with one or more authenticators 130. Each authenticator 130 may communicate with one or more enforcement points 120, one or more other authenticators 130, and/or one or more authentication servers 140. FIG. 1 shows an example connection among the entities in deployment 100. These entities may also be connected in other manners, e.g., the dashed connections may be omitted. An enforcement point is an entity that enforces or applies any authentication that a peer has completed on inbound and outbound data for the peer. The enforcement points, authenticators, and authentication servers are logical entities, and one or more of these entities may be co-located within a physical network entity. The enforcement points and authenticators may be separate network entities, as shown in FIG. 1. A single network entity may also perform the functions of different logical entities such as an enforcement point and an authenticator. The various logical entities in FIG. 1 are described in RFC 3748.

Enforcement points 120 and authenticators 130 may be implemented by different network entities in different communication networks. In a WLAN, an enforcement point may be implemented by an access point, and an authenticator may be implemented by a WLAN switch. In a cellular network, an enforcement point may be implemented by a base station, and an authenticator may be implemented by a Radio Network Controller (RNC). An authentication server may be implemented by an Authentication, Authorization and Accounting (AAA) server in both a WLAN and a cellular network.

Figure 2:
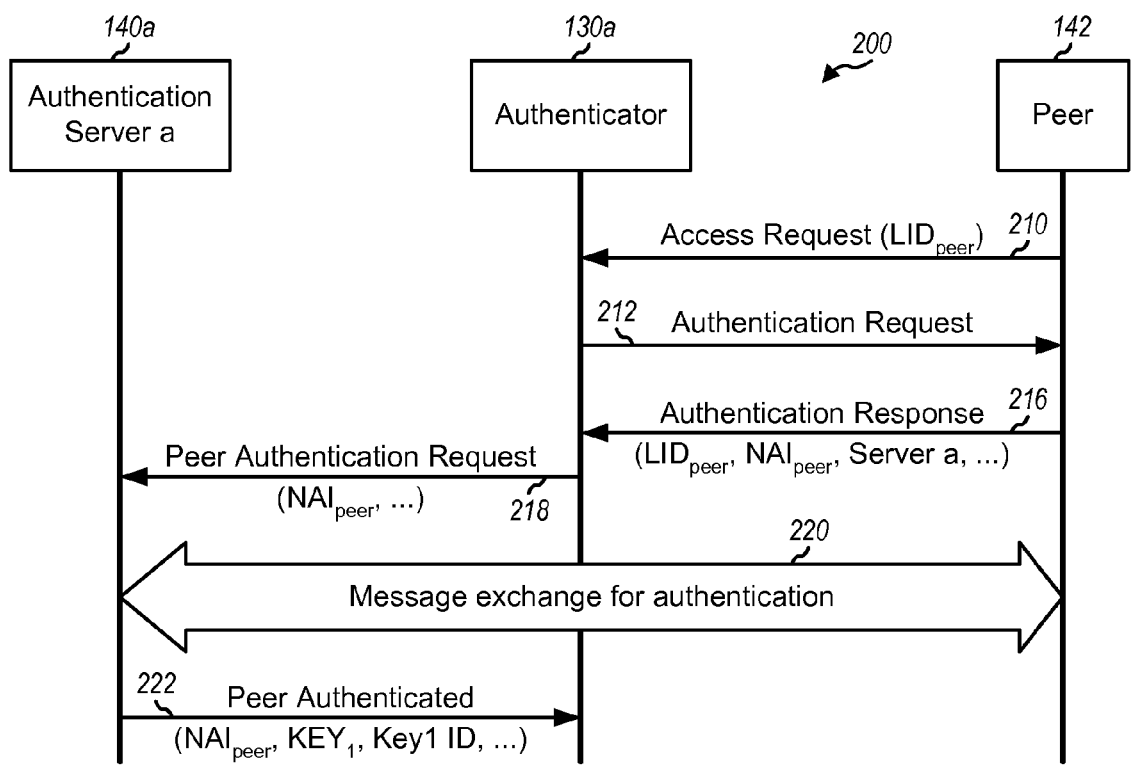
FIG. 2 shows a process for performing authentication.

FIG. 2 shows a message flow for an authentication process 200. Peer 110 may initially send an access request to enforcement point 120a, which may forward the request to authenticator 130a (step 210). For the authentication process, enforcement point 120a may simply forward messages between peer 110 and authenticator 130a and is not shown in FIG. 2 for clarity. Peer 110 may send the access request as well as other messages to authenticator 130a using a lower layer identifier $LID_{peer}$ assigned to peer 110. A lower layer identifier may be a Medium Access Control (MAC) address or some other lower layer identifier used between a peer and an authenticator/enforcement point. Authenticator 130a may receive the access request, determine that it has no record for peer 110, and send an authentication request to peer 110 (step 212).

Peer 110 may respond to the authentication request by sending an authentication response that may include an address or identity of an authentication server to be used for authentication of peer 110, a network access identifier $NAI_{peer}$ assigned to peer 110, etc. (step 216). In this example, authentication server 140a is selected by peer 110, and the authentication response may include the address of authentication server 140a (Server a). The $NAI_{peer}$ may be any identifier used between peer 110 and authentication server 140a and may not need to be known by authenticator 130a. Peer 110 may thus send an anonymous authentication response and omit the $NAI_{peer}$. Authenticator 130a may receive the authentication response from peer 110 and send a peer authentication request to authentication server 140a, which is identified by the authentication response (step 218). Authentication server 140a may then exchange messages with peer 110 for authentication of peer 110 or for mutual authentication (step 220). Authentication server 140a may have credentials (e.g., a username and a password) for peer 110 and may authenticate peer 110 based on the credentials. Similarly, peer 110 may have stored information for authentication server 140a and may authenticate the server based on the stored information. The authentication in step 220 may be performed based on any authentication scheme such as Authentication and Key Agreement (AKA), Transport Layer Security (TLS), Tunneled TLS (TTLS), etc., which are known in the art.

After authentication is completed, authentication server 140a may send a peer authenticated message to authenticator 130a (step 222). This message may include pertinent information such as, e.g., a cryptographic key $KEY_1$ to use for communication with peer 110, a key ID for $KEY_1$ (Key1 ID), etc. A cryptographic key is also referred to as simply, a key. Authenticator 130a may forward the pertinent information to enforcement point 120a (not shown in FIG. 2). Enforcement point 120a may use $KEY_1$ or a derived key generated from $KEY_1$ for encryption and/or integrity protection of data exchanged between enforcement point 120a and peer 110. Encryption refers to a process of randomizing data with a key such that the original data is unrecognizable and the encrypted data may be recovered with the same key or a complementary key depending on the type of cryptography. Integrity protection refers to a process of generating a message authentication code for data with a key and sending this code along with the data. The message authentication code may be used by a recipient entity to verify that the sending entity used the correct key to generate the code and that the data has not been altered. Data for the authentication, which is data that is permitted to be sent by the authentication, may be securely exchanged using the key generated by the authentication.

FIG. 2 shows an example message flow in which authenticator 130a initiates authentication. Peer 110 may also initiate authentication, In such a case, the authentication request/response messages may be reversed in direction. In general, fewer, additional and/or different steps may be used for a message flow for authentication. Each step in the message flow may represent one or more messages sent by one entity or multiple messages exchanged between different entities.

FIG. 2 shows one authentication between peer 110 and authentication server 140a. Peer 110 may perform multiple authentications with one or more authentication servers, e.g., for access and service authentications, for device and user authentications, for network access provider (NAP) and Internet service provider (ISP) authentications, etc. The multiple authentications may be performed (i) sequentially so that one authentication is completed before the next authentication is started, (ii) in parallel so that more than one authentication may be pending at a given moment, or (iii) a combination of both. The multiple authentications may be via the same or different authenticators. For example, different authenticators may be used for (i) different types of authentication in some architectures, (ii) for access and service authentications when the access and service providers are different, etc. The multiple authentications may also be with the same or different authentication servers. Multiple authentications may be especially applicable when different authentication servers need to authenticate peer 110 for different reasons, e.g., when the access and service providers are different.

In general, an authentication may or may not result in a key being generated and passed to an authenticator. When multiple authentications are performed, each authentication may generate a different key, a subset of the authentications may generate keys, or none of the authentications may generate key. When at least one authentication is not key generating, a man-in-the-middle attack may be possible.

Figure 3:
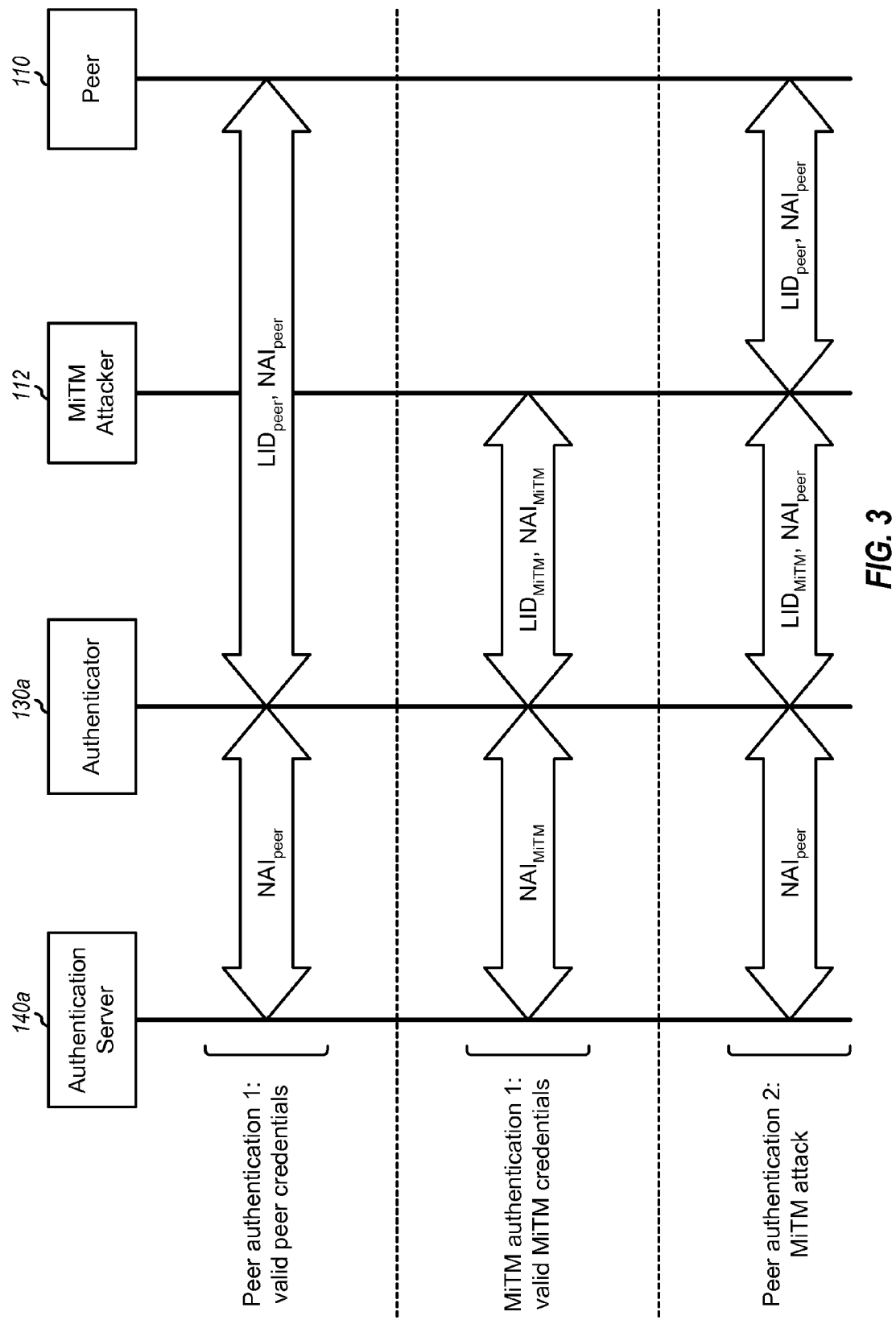
FIG. 3 shows two authentications for a peer with a MiTM attack.

FIG. 3 shows two authentications for peer 110 with a man-in-the-middle (MiTM) attack. Peer 110 may perform a first authentication with authentication server 140a via authenticator 130a using the $LID_{peer}$ and $NAI_{peer}$ of peer 110, e.g., as described above for FIG. 2. Peer 110 may be authenticated by authentication server 140a based on valid credentials stored at server 140a for peer 110.

A MiTM attacker 112 may also perform an authentication with authentication server 140a via authenticator 130a using a lower layer identifier $LID_{MiTM}$ and a network access identifier $NAI_{MiTM}$ assigned to MiTM attacker 112. MiTM attacker 112 may be authenticated by authentication server 140a based on valid credentials stored at server 140a for MiTM attacker 112.

Peer 110 may attempt a second authentication with authentication server 140a via authenticator 130a using the $LID_{peer}$ and $NAI_{peer}$ of peer 110. MiTM attacker 112 may intercept the authentication response from peer 110 for the second authentication, replace the $LID_{peer}$ of peer 110 with the $LID_{MiTM}$ of attacker 112, and forward the tampered authentication response to authenticator 130a. Authenticator 130a may have no way to detect that the authentication response from MiTM attacker 112 has been tampered and may carry out the authentication in the normal manner. MiTM attacker 112 may be authenticated by authentication server 140a and may obtain service using its $LID_{MiTM}$ and the $NAI_{peer}$ of peer 110. Billings related to the second authentication may be redirected to peer 110, which is assigned $NAI_{peer}$.

In FIG. 3, the first authentication for peer 110 may generate a key, and this key may be used to authenticate data from peer 110. The first and second authentications for peer 110 may occur sequentially or in parallel. The second authentication for peer 110 may be either not key generating or key generating but no key is used to authenticate data from peer 110.

In an aspect, multiple authentications for a peer may be bound based on a unique identifier for the peer. The unique identifier may be exchanged securely between the peer, an authentication server, and an authenticator in order to prevent an MiTM attack. Data for all authentications bound by the unique identifier may be exchanged securely based on one or more keys generated by all or a subset of these authentications.

Figure 4:
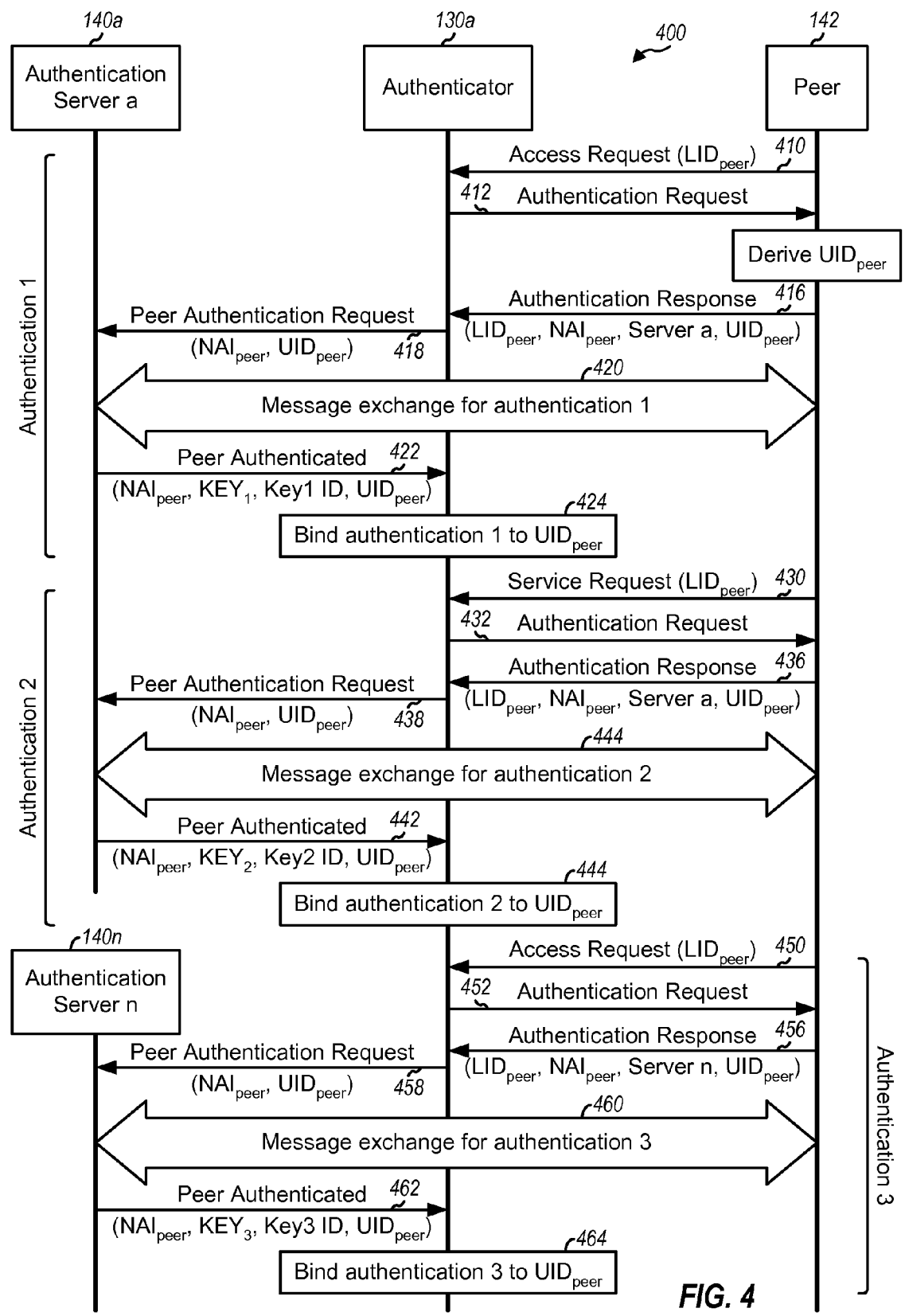
FIG. 4 shows a process for multiple authentications with a unique identifier.

FIG. 4 shows a message flow for a process 400 for binding multiple authentications with a unique identifier. Peer 110 may initially send an access request to authenticator 130a using the $LID_{peer}$ of peer 110 (step 410). Authenticator 130a may respond by sending an authentication request to peer 110 (step 412).

For the first authentication, peer 110 may derive a unique identifier $UID_{peer}$ for itself, as described below (step 414). Peer 110 may then send an authentication response that may include the address of authentication server 140a to be used for the first authentication, the $NAI_{peer}$ and $UID_{peer}$ of peer 110, etc. (step 416). The $UID_{peer}$ may be sent in a secured manner (e.g., using encryption and/or integrity protection) based on a key shared between peer 110 and authentication server 140a. The $UID_{peer}$ may be carried from peer 110 to authentication server 140a, e.g., via an EAP method described in RFC 3748 or some other secure method. The other information (e.g., the $NAI_{peer}$) may or may not be sent in a secured manner along with the $UID_{peer}$. Authenticator 130a may receive the authentication response from peer 110 and send a peer authentication request to authentication server 140a (step 418).

Authentication server 140a may then exchange messages with peer 110 for authentication of peer 110 or for mutual authentication (step 420). After authentication is completed, authentication server 140a may send a peer authenticated message to authenticator 130a (step 422). This message may include pertinent information such as, e.g., a key $KEY_1$ to use for communication with peer 110, a key ID for $KEY_1$, the $UID_{peer}$ of peer 110, etc. The $UID_{peer}$ may be sent in a secured manner (e.g., using encryption and/or integrity protection) based on a key shared between authentication server 140a and authenticator 130a. Authenticator 130a may record the $UID_{peer}$ of peer 110 and may bind the first authentication as well as $KEY_1$ generated by this authentication to this $UID_{peer}$ (step 424). Authenticator 130a may also bind the $LID_{peer}$ of peer 110 to the $UID_{peer}$. Binding refers to associating different items (e.g., an authentication, a key, a UID, a LID, etc.) and/or different instances of a given item (e.g., multiple authentications, multiple keys, etc.) together. Binding, associating, and mapping are synonymous terms that may be used interchangeably.

After completing the first authentication, or in parallel with the first authentication, peer 110 may send a service request to authenticator 130a using the $LID_{peer}$ of peer 110 (step 430). Authenticator 130a may respond by sending an authentication request to peer 110 (step 432). In general, the second authentication may be triggered by peer 110 (e.g., if peer 110 knows that multiple authentications are to be performed, e.g., for device and user authentications) or by an authenticator.

For the second authentication, peer 110 may use the same $UID_{peer}$ derived previously for the first authentication. Peer 110 may send an authentication response that may include the address of authentication server 140a to be used for the second authentication, the $NAI_{peer}$ and $UID_{peer}$ of peer 110, etc. (step 436). Again, the $UID_{peer}$ may be sent in a secured manner. Authenticator 130a may receive the authentication response from peer 110 and may send a peer authentication request to authentication server 140a (step 438).

Authentication server 140a may then exchange messages with peer 110 for authentication (step 440). After authentication is completed, authentication server 140a may send a peer authenticated message to authenticator 130a (step 442). This message may include pertinent information such as, e.g., a key $KEY_2$ to use for communication with peer 110, a key ID for $KEY_2$, the $UID_{peer}$ of peer 110, etc. In general, $KEY_2$ may or may not be generated by the second authentication. Authenticator 130a may receive the peer authenticated message, extract the $UID_{peer}$ from the message, and recognize that this $UID_{peer}$ is already stored at authenticator 130a. Authenticator 130a may then determine that this authentication is for the same peer 110 based on the matched $UID_{peer}$. Authenticator 130a may bind the second authentication as well as $KEY_2$ (if generated by the second authentication) to the $UID_{peer}$ (step 444). Authenticator 130a essentially binds the first and second authentications for peer 110 to the same $UID_{peer}$.

In the example shown in FIG. 4, peer 110 may send an access request for a different network to authenticator 130a using the $LID_{peer}$ of peer 110 (step 450). Authenticator 130a may respond by sending an authentication request to peer 110 (step 452). In general, the third authentication may be triggered by peer 110 or an authenticator and may be for any reason.

For the third authentication, peer 110 may use the same $UID_{peer}$ derived previously for the first authentication. Peer 110 may send an authentication response that may include the address of authentication server 140n (Server n) to be used for the third authentication, the $NAI_{peer}$ and $UID_{peer}$ of peer 110, etc. (step 456). Again, the $UID_{peer}$ may be sent in a secured manner. Authenticator 130a may receive the authentication response from peer 110 and may send a peer authentication request to authentication server 140n, which is selected by peer 110 (step 458).

Authentication server 140n may then exchange messages with peer 110 for authentication (step 460). After authentication is completed, authentication server 140n may send to authenticator 130a a peer authenticated message that may include pertinent information such as, e.g., a key $KEY_3$ to use for communication with peer 110, a key ID for $KEY_3$, the $UID_{peer}$ of peer 110, etc. (step 442). In general, $KEY_3$ may or may not be generated by the third authentication. Authenticator 130a may receive the peer authenticated message, recognize that this $UID_{peer}$ is already stored at authenticator 130a, and bind the third authentication as well as $KEY_3$ (if generated) to the $UID_{peer}$ (step 464). Authenticator 130a essentially binds the first, second and third authentications for peer 110 to the same $UID_{peer}$, even though these authentications were performed via different authentication servers 140a and 140n.

In general, peer 110 may perform any number of authentications with any number of authentication servers. These multiple authentications may be performed sequentially (as shown in FIG. 4), or in parallel (not shown in FIG. 4), or a combination of both. Each authentication may be mutually authenticating so that peer 110 is authenticated to an authentication server and the authentication server is also authenticated to peer 110. Each authentication may or may not generate a key. Authenticator 130a may bind all authentications and all keys with the same $UID_{peer}$ to peer 110. Only one authentication may be key generating, and all authentications bound with this authentication may securely exchange data based on the key from this one authentication.

The $UID_{peer}$ may be securely exchanged between peer 110 and each authentication server, e.g., using encryption and/or integrity protection based on credentials known by peer 110 and the authentication server. In this case, an MiTM attacker would not be able to intercept the $UID_{peer}$ and hijack the authentication exchange.

In the design shown in FIG. 4, peer 110 sends the $UID_{peer}$ in the authentication response to authenticator 140a in steps 416, 436 and 456, and authenticator 140a forwards the $UID_{peer}$ to authentication servers 140a and 140n. Peer 110 may also send the $UID_{peer}$ at other times, e.g., in steps 420, 440, 460, etc.

In general, a UID may be derived in various manners. In one design, peer 110 generates a pseudo-random number (PRN) and uses this PRN as the UID. Different peers may independently generate different PRNs. The likelihood of two peers generating the same PRN, which is referred to as a collision, is dependent on the length of the PRN. For example, if the PRN has a length of 32 bits, then the probability of collision may be $\frac{1}{2^{32}}$. In general, the PRN may be any length, e.g., 32 bits, 48 bits, 64 bits, etc. The PRN may be defined to be sufficiently long to achieve the desired probability of collision. PRNs of the same length may be used for all authentications. Alternatively, PRNs of different lengths may be for different authentications, where the PRN length for each authentication may be dependent on security requirements and/or other factors.

In another design, an ID assigned to peer 110 or a pseudo version of this ID may be used as the UID. For example, the UID may be an Electronic Serial Number (ESN), a Mobile Equipment Identifier (MEID), an International Mobile Subscriber Identity (IMSI), a Mobile Identification Number (MIN), a pseudo-ESN, a temporary IMSI, or some other true or pseudo ID assigned to peer 110. In yet another design, an address assigned to peer 110 may be used as the UID. For example, the UID may be a MAC address, an IP address, etc. In general, an ID or address of any kind that is unique to a peer (or has sufficiently low probability of collision) may be used as the UID for binding authentications for the peer.

A single UID may be used for all authentications for peer 110. All of these authentications may be bound to this single UID. The authentications for peer 110 may also be divided into multiple groups, with each group including one or more authentications. A different UID may be used for each group. All authentication(s) in each group may be bound by the UID for that group. In general, one UID may be used for all authentications to be bound together. A given UID may be used for one or more authentications.

In the design shown in FIG. 4, peer 110 may derive a UID and securely send this UID to each authentication server. A UID may also be generated by an entity other than peer 110. In another design, an authentication server may generate an UID and provide this UID to both peer 110 and an authenticator. Peer 110 may inform the authentication server for the first authentication (e.g., during step 420) that a UID has not been generated for peer 110. In response, the authentication server may generate a UID for peer 110. Peer 110 may use this UID for each subsequent authentication to be bound with the first authentication. In yet another design, an authenticator may generate a UID for peer 110.

In the example shown in FIG. 4, peer 110 performs multiple authentications via a single authenticator 140a, which binds all of the authentications and keys to the $UID_{peer}$ of peer 110. Peer 110 may also perform multiple authentications via multiple authenticators, e.g., using the same $UID_{peer}$. In this case, the $UID_{peer}$ may be securely conveyed to all authenticators in order to synchronize these authenticators.

The multiple authentications for peer 110 may be enforced at one or more enforcement points. If all authentications are enforced by a single enforcement point, then all authenticator(s) used for the multiple authentications may pass security information (e.g., keys) for peer 110 and possibly the $UID_{peer}$ to this enforcement point. Alternatively, one authenticator may pass the $UID_{peer}$ of peer 110 and security information to the enforcement point, and the remaining authenticators may pass only the $UID_{peer}$ of peer 110. If the multiple authentications are enforced by multiple enforcement points, then each enforcement point may receive the $UID_{peer}$ of peer 110 and any associated security information for the authentication(s) to be enforced by that enforcement point. In general, each enforcement point may enforce all authentications responsible by that enforcement point based on security information associated with the authentications being enforced.

The binding of multiple authentications via a single UID allows a key generated by one authentication to be used for data exchanges for another authentication. In fact, a single key generated by a single authentication may be used for all of the authentications. Data for an authentication that is non-key generating may be securely sent using a key from another authentication that is key generating. This is possible since the two authentications are bound to the same UID and hence the same peer.

Multiple keys may be generated by the multiple authentications. In this case, secure data exchanges for the multiple authentications may be achieved in various manners. In one design, a single key may be selected from among the multiple keys and used to securely send data for all authentications. In another design, the multiple keys may be used to generate a compound key, which may then be used to securely send data for all authentications. In yet another design, the data for each key-generating authentication may be securely sent using the key generated by that authentication. The data for each non-key generating authentication may be securely sent using a key from a key-generating authentication or a compound key. Data for the multiple authentications may also be securely sent in other manners.

FIG. 5 shows a design of a process 500 performed by a peer for multiple authentications with a unique identifier. A unique identifier for the peer may be obtained (block 512). Multiple authentications may be performed with at least one authentication server, with the unique identifier being used to bind the multiple authentications to the peer (block 514). The unique identifier may be derived by the peer based on a pseudo-random number, an identifier or an address assigned to the peer, etc. The unique identifier may be securely sent by the peer to each authentication server using encryption and/or integrity protection. The unique identifier may also be obtained by the peer from an authentication server or an authenticator. The multiple authentications may be performed sequentially and/or in parallel and may be for access authentication, service authentication, device authentication, user authentication, NAP authentication, ISP authentication, etc.

At least one cryptographic key may be obtained from the multiple authentications (block 516). Data for the multiple authentications may be securely exchanged based on the at least one cryptographic key (block 518). For example, a cryptographic key may be obtained from a first authentication and used to securely exchange data for a second authentication.

FIG. 6 shows a design of a process 600 performed by an authentication server. A unique identifier for a peer may be obtained, e.g., securely received from the peer or an authenticator, or generated by the authentication server (block 612). Authentication may be performed with the peer (block 614). The unique identifier may be associated with the peer (block 616). An indication of the peer being authenticated, the unique identifier, and possibly security information (e.g., a cryptographic key) may be sent to an authenticator, which may use the unique identifier to bind the authentication to the peer (block 616).

FIG. 7 shows a design of a process 700 performed by an authenticator. Results of at least one authentication between at least one authentication server and a peer may be received (block 712). The at least one authentication may be bound to the peer based on a unique identifier (block 714). At least one cryptographic key may be obtained from the results of the at least one authentication (block 716). Either the at least one cryptographic key or at least one derived key (which may be generated based on the at least one cryptographic key) and possibly the unique identifier may be forwarded to an enforcement point for the at least one authentication (block 718). The at least one authentication may also be enforced by the authenticator based on the at least one cryptographic key. Results of one or more other authentications for the peer and the unique identifier may also be received from another authenticator. The at least one authentication and the one or more other authentications for the peer may be bound based on the unique identifier.

In another aspect, multiple levels of security (or nested security) may be used for multiple authentications for a peer. For example, peer 110 may perform a first authentication (e.g., access or device authentication) with a first authentication server and obtain a first key $KEY_1$. Peer 110 may also perform a second authentication (e.g., service or user authentication) with a second authentication server and obtain a second key $KEY_2$. Data for the desired service may thereafter be securely exchanged using the two keys $KEY_1$ and $KEY_2$.

In general, peer 110 may perform any number of authentications with any number of authentication servers. Each authentication may or may not be key generating. A key generated by a given authentication may be used to securely exchange data for that authentication.

For nested security, the multiple authentications may be performed via one or more authenticators and may be enforced by one or more enforcement points. Each authenticator may obtain one or more keys for one or more authentications and may bind all of the key(s) to the peer, e.g., based on the LID or some other ID for the peer. Each enforcement point may receive one or more keys for one or more authentications from one or more authenticators. Each enforcement point may securely exchange data with the peer using the one or more keys received by that enforcement point.

FIG. 8 shows nested security for two authentications. Authentication 1 may be for service authentication, and authentication 2 may be access authentication. Data for authentication 1 may be exchanged between peer 110 and an enforcement point for a service provider. Data for authentication 2 may be exchanged between peer 110 and an access point in an access network. The same or different enforcement points may be used for authentications 1 and 2.

Packet 1 for authentication 1 may include a header, a payload, and a trailer. The payload may carry data, which may be encrypted and/or integrity protected with a key generated by authentication 1. The header may carry a key ID of the key generated by authentication 1 and used for the data sent in the payload. The trailer may carry a message authentication code (MAC1), which may be generated based on the data sent in the payload with the key generated by authentication 1. The message authentication code may be used by a recipient of the packet to verify the integrity of the data sent in the payload as well as proof of ownership of the key used by a sender of the packet.

Similarly, packet 2 for authentication 2 may include a header, a payload, and a trailer. The payload for packet 2 may carry the entire packet 1, which may be encrypted and/or integrity protected with a key generated by authentication 2. The header may carry a key ID of the key generated by authentication 2. The trailer may carry a message authentication code (MAC2) generated based on the data in the payload of packet 2 and with the key generated by authentication 2.

Peer 110 may perform the nested processing shown in FIG. 8 to send data for authentications 1 and 2. If a single enforcement point is used for both authentications 1 and 2, then this enforcement point may extract (e.g., decrypt and/or verify) data from both payloads in both packets 1 and 2. If different enforcement points are used for authentications 1 and 2, then the enforcement point for authentication 2 may extract the data from the payload of packet 2, and the enforcement point for authentication 1 may extract the data from the payload of packet 1.

In another design, data is securely processed (e.g., encrypted and/or integrity protected) with the keys generated by both authentications 1 and 2 to obtain a data packet. For example, data may be securely processed with the key generated by authentication 1 to obtain first processed data, which may be further securely processed with the key generated by authentication 2 to obtain second processed data, which may be sent in the payload of the data packet. The data packet may include a single header, which may contain the key IDs of both keys. The data packet may further include a single trailer that may include MAC1 and/or MAC2.

FIG. 9 shows a design of a process 900 performed by a peer for multiple authentications with nested security. First and second authentications may be performed with at least one authentication server (block 912). The first authentication may be performed with a first authentication server, and the second authentication may be performed with the first authentication server or a second authentication server. First and second security information, e.g., first and second cryptographic keys, may be obtained for the first and second authentications, respectively (block 914). Thereafter, a data packet may be generated with the first and second security information obtained from the first and second authentications (block 916).

In one design, data may be securely processed (e.g., encrypted and/or integrity protected) based on the first security information (e.g., the first cryptographic key) to obtain an initial packet. The initial packet may be securely processed based on the second security information (e.g., the second cryptographic key) to obtain the data packet. In another design, data may be securely processed with both the first and second security information to obtain the data packet. The same secure processing (e.g., encryption and/or integrity protection) may be performed with each of the first and second security information. Alternatively, one type of secure processing (e.g., encryption) may be performed with the first security information, and another type of secure processing (e.g., integrity protection) may be performed with the second security information.

In yet another aspect, sequential security may be used for multiple authentications for a peer. For example, peer 110 may perform first authentication with a first authentication server and obtain a first key $KEY_1$. After completing the first authentication, $KEY_1$ may be used for secure processing for each subsequent authentication. The subsequent authentications may be performed sequentially or in parallel after the first authentication.

Figure 10:
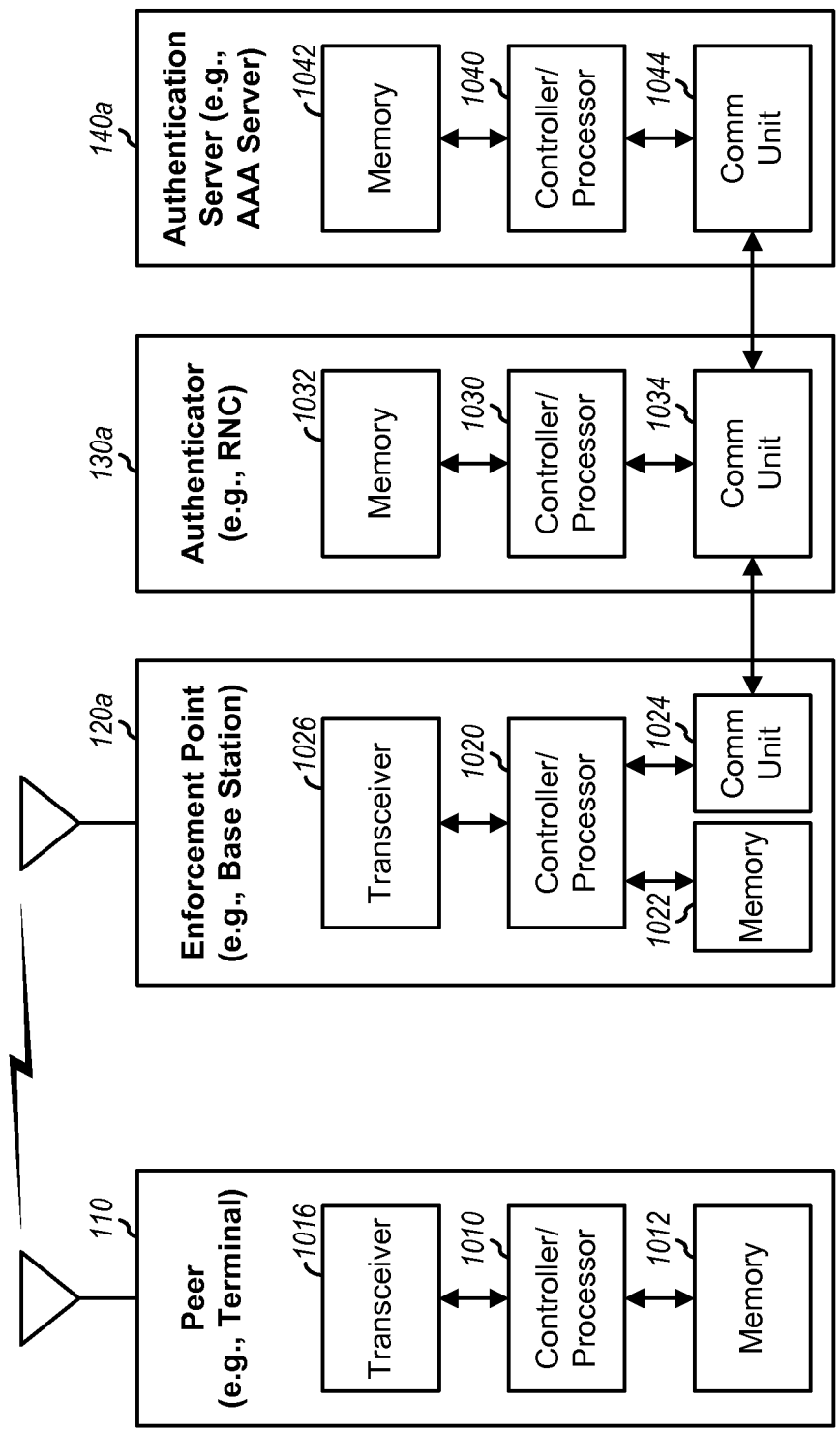
FIG. 10 shows a block diagram of various entities in FIG. 1.

FIG. 10 shows a block diagram of peer 110, enforcement point 120a, authenticator 130a, and authentication server 140a in FIG. 1. Peer 110 may be a terminal, etc. Enforcement point 120a may be a base station, an access point, etc. Authenticator 130a may be a WLAN switch, an RNC, etc. Authentication server 140a may be an AAA server, etc. For simplicity, FIG. 10 shows (a) one controller/processor 1010, one memory 1012, and one transceiver 1016 for peer 110, (b) one controller/processor 1020, one memory 1022, one communication (Comm) unit 1024, and one transceiver 1026 for enforcement point 120a, (c) one controller/processor 1030, one memory 1032, and one communication unit 1034 for authenticator 130a, and (d) one controller/processor 1040, one memory 1042, and one communication unit 1044 for authentication server 140a. In general, each entity may include any number of controllers, processors, memories, transceivers, communication units, etc.

Peer 110 may send data to enforcement point 120a. The data may be processed by processor 1010 and conditioned by transceiver 1016 to generate a modulated signal, which may be transmitted via an antenna. At enforcement point 120a, the signal from peer 110 may be received and conditioned by transceiver 1026 and further processed by processor 1020 to recover the data sent by peer 110. Enforcement point 120a may also send data to peer 110. The data may be processed by processor 1020 and conditioned by transceiver 1026 to generate a modulated signal, which may be transmitted to peer 110. At peer 110, the signal from enforcement point 120a may be received and conditioned by transceiver 1016 and processed by processor 1010 to recover the data sent by enforcement point 120a.

Processor 1010 may perform processing for peer 110 for authentication, data exchange, etc. Processor 1010 may perform process 500 in FIG. 5, process 900 in FIG. 9, and/or other processes for authentication and data exchange. Memories 1012 and 1022 may store program codes and data for peer 110 and enforcement point 120a, respectively. Enforcement point 120a may communicate with other entities, such as authenticator 130a, via communication unit 1024.

Within authenticator 130a, processor 1030 may perform processing for authenticator 130a and direct the operation of various units within the authenticator. Memory 1032 may store program codes and data for authenticator 130a. Processor 1030 may perform process 700 in FIG. 7 and/or other processes for authentication of peers. Communication unit 1034 may support communication between authenticator 130a and other entities such as enforcement point 120a and authentication server 140a.

Within authentication server 140a, processor 1040 may perform processing for authentication server 140a and direct the operation of various units within the authentication server. Processor 1040 may perform process 600 in FIG. 6 and/or other processes for authentication of peers. Memory 1042 may store program codes and data for authentication server 140a. Communication unit 1044 may support communication between authentication server 140a and other entities such as authenticator 130a.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus for a peer in a communication system, comprising:
    a processor of the peer to obtain a unique identifier for the peer, to perform multiple authentications for the peer with at least one authentication server, and to obtain at least one cryptographic key for the peer from the at least one authentication server,
    wherein for each of the multiple authentications, the processor is configured to:
        receive an authentication request from an authenticator, and
        then send an authentication response with the unique identifier to the authenticator,
    wherein the unique identifier is sent to the at least one authentication server and is used to bind the multiple authentications and the at least one cryptographic key to the peer such that the processor is configured to securely exchange data for the multiple authentications based on the at least one cryptographic key; and
    a memory coupled to the processor.

2. The apparatus of claim 1, wherein the processor is configured to generate a pseudorandom number and uses the pseudo-random number as the unique identifier for the peer.

3. The apparatus of claim 1, wherein the processor is configured to use an identifier or an address assigned to the peer as the unique identifier for the peer.

4. The apparatus of claim 1, wherein the processor is configured to receive the unique identifier from the at least one authentication server or the authenticator.

5. The apparatus of claim 1, wherein the processor is configured to securely send the unique identifier to the at least one authentication server for a first authentication, and securely send the unique identifier to the at least one authentication server for a second authentication.

6. The apparatus of claim 1, wherein the processor is configured to securely send the unique identifier to a first authentication server for a first authentication and securely send the unique identifier to a second authentication server for a second authentication, the second authentication server being different from the first authentication server.

7. The apparatus of claim 1, wherein the processor is configured to securely send the unique identifier to each of the at least one authentication server using encryption, or integrity protection, or both.

8. The apparatus of claim 1, wherein the processor is configured to obtain a cryptographic key from a first authentication and securely exchange data for a second authentication based on the cryptographic key obtained from the first authentication, wherein the multiple authentications with the at least one server include the first authentication and the second authentication.

9. The apparatus of claim 1, wherein the multiple authentications comprise access authentication and service authentication.

10. The apparatus of claim 1, wherein the multiple authentications comprise device authentication and user authentication.

11. The apparatus of claim 1, wherein the multiple authentications comprise a first authentication for a network access provider (NAP) and a second authentication for an Internet service provider (ISP).

12. The apparatus of claim 1, wherein the processor is configured to perform the multiple authentications in a sequential order.

13. The apparatus of claim 1, wherein the processor is configured to perform the multiple authentications in parallel.

14. A method comprising:
    obtaining a unique identifier for a peer, at the peer;
    performing multiple authentications for the peer, with at least one authentication server; and
    obtaining at least one cryptographic key for the peer, from the at least one authentication server,
    wherein performing multiple authentications comprises, for each of the multiple authentications,
        receiving an authentication request from an authenticator, and
        sending an authentication response with the unique identifier and information for the at least one authentication server to the authenticator,
    wherein the unique identifier is sent to the at least one authentication server and is used to bind the multiple authentications and the at least one cryptographic key to the peer such that data for the peer is securely exchanged for the multiple authentications based on the at least one cryptographic key.

15. The method of claim 14, wherein the deriving the unique identifier for the peer comprises
    generating a pseudo-random number, and
    using the pseudo-random number as the unique identifier for the peer.

16. The method of claim 14, further comprising:
    obtaining a cryptographic key from a first authentication; and
    securely exchanging data for a second authentication based on the cryptographic key obtained from the first authentication, wherein the multiple authentications include the first authentication and the second authentication.

17. An apparatus comprising:
means for obtaining a unique identifier for a peer, at the peer;
means for performing multiple authentications for the peer, with at least one authentication server; and
means for obtaining at least one cryptographic key for the peer, from the at least one authentication server,
wherein the means for performing multiple authentications comprises, for each of the multiple authentications,
means for receiving an authentication request from an authenticator, and
means for sending an authentication response with the unique identifier and information for the at least one authentication server to the authenticator,
wherein the unique identifier is sent to the at least one authentication server and is used to bind the multiple authentications and the at least one cryptographic key to the peer such that data for the peer is securely exchanged for the multiple authentications based on the at least one cryptographic key.

18. A non-transitory processor-readable storage medium for storing instructions, which when read by a processor, causes the processor to perform operations comprising:
obtaining a unique identifier for a peer, at the peer;
performing multiple authentications for the peer, with at least one authentication server; and
obtaining at least one cryptographic key for the peer, from the at least one authentication server,
wherein performing multiple authentications, for each of the multiple authentications, comprises
receiving an authentication request from an authenticator, and
sending an authentication response with the unique identifier to the authenticator,
wherein the unique identifier is sent to the at least one authentication server and is used to bind the multiple authentications and the at least one cryptographic key to the peer such that data for the peer is securely exchanged for the multiple authentications based on the at least one cryptographic key.

19. An apparatus for an authentication server, comprising:
a processor at the server that is configured to obtain a unique identifier for a peer, to perform multiple authentications with the peer at the server, and to associate the unique identifier with the peer, wherein the unique identifier is included in an authentication response sent from the peer to an authenticator, the processor is further configured to send a cryptographic key for the peer, to the authenticator, wherein the unique identifier is used to bind the authentication and the cryptographic key from the authentication server to the peer such that data is securely exchanged for multiple authentications based on the cryptographic key; and
a memory coupled to the processor.

20. The apparatus of claim 19, wherein the processor is configured to securely receive the unique identifier from the peer or the authenticator.

21. The apparatus of claim 19, wherein the processor is configured to generate the unique identifier for the peer.

22. The apparatus of claim 19, wherein the processor is configured to send an indication of the peer being authenticated and the unique identifier to the authenticator.

23. The apparatus of claim 19, wherein the processor is configured to send an indication of the peer being authenticated, the unique identifier, and a cryptographic key to the authenticator.

24. A method performed by an authentication server comprising:
obtaining by the authentication server a unique identifier for a peer at the server, the unique identifier being included in an authentication response sent from the peer to an authenticator, the authentication server receiving the authentication response from the authenticator;
performing multiple authentications with the peer for the peer;
associating the unique identifier with the peer;
sending a cryptographic key for the peer to the authenticator, wherein the unique identifier is used to bind the authentications and the cryptographic key from the authentication server to the peer such that data for the peer is securely exchanged for the multiple authentications based on the cryptographic key.

25. The method of claim 24, wherein the obtaining by the authentication server the unique identifier for the peer comprises:
securely receiving by the authentication server the unique identifier from the peer or the authenticator.

26. The method of claim 24, further comprising:
sending by the authentication server an indication of the peer being authenticated and the unique identifier to the authenticator.

27. An apparatus comprising:
a processor of an authentication server that is configured to
receive results of at least one authentication for a peer, the at least one authentication between at least one authentication server and the peer,
to obtain at least one cryptographic key for the peer, from the at least one authentication server,
to bind the at least one authentication and the at least one cryptographic key to the peer based on a unique identifier for the peer, such that the processor is configured to securely exchange data for multiple authentications for the peer, based on the at least one cryptographic key; and
a memory coupled to the processor,
wherein the processor is configured to generate a pseudo-random number and uses the pseudo-random number as the unique identifier for the peer, or wherein the processor is configured to use an identifier or an address assigned to the peer as the unique identifier for the peer.

28. The apparatus of claim 27, wherein the processor is configured to forward the at least one cryptographic key or at least one derived key to an enforcement point for the at least one authentication.

29. The apparatus of claim 27, wherein the processor is configured to enforce the at least one authentication based on the at least one cryptographic key.

30. The apparatus of claim 27, wherein the processor is configured to obtain a cryptographic key from a first authentication for the peer and use the cryptographic key for a second authentication for the peer, wherein the at least one authentication include the first authentication and the second authentication.

31. The apparatus of claim 27, wherein the processor is configured to receive the results of the at least one authentication from the at least one authentication server, receive results of one or more other authentications for the peer and the unique identifier from the authenticator, and bind the at least one authentication and the one or more other authentications for the peer based on the unique identifier.

32. A method of performing at least one authentication comprising:

sending an authentication request for an authentication to a peer;

receiving an authentication response from the peer with a unique identifier for the peer;

forwarding the unique identifier to at least one authentication server;

receiving results of the at least one authentication between the at least one authentication server and the peer;

obtaining at least one cryptographic key for the peer, from the at least one authentication server; and binding the at least one authentication and the at least one cryptographic key to the peer based on the unique identifier such that the processor is configured to securely exchange data for multiple authentications for the peer based on the at least one cryptographic key.

33. The method of claim 32, further comprising:

forwarding the at least one cryptographic key or at least one derived key to an enforcement point for the at least one authentication.

34. An apparatus comprising:

a processor that is configured to perform first and second authentications with at least one authentication server, to obtain first and second security information for the first and second authentications, respectively, from an authenticator, and to generate a first data packet including a first data packet header, wherein the first data packet header includes the first security information, and to generate a second data packet including a second data packet header and a second data packet payload, wherein the second data packet header includes the second security information and the second data packet payload includes the first data packet; and a memory coupled to the processor.

35. The apparatus of claim 34, wherein the processor is configured to perform the first authentication with a first authentication server, and perform the second authentication with a second authentication server, the second authentication server being different from the first authentication server.

36. The apparatus of claim 34, wherein the processor is configured to perform the first and second authentications with a single authentication server.

37. The apparatus of claim 34, wherein the processor is configured to securely process data with the first security information to obtain an initial packet, and securely process the initial packet with the second security information to obtain the data packet.

38. The apparatus of claim 34, wherein the processor is configure to securely process data with both the first and second security information to obtain the data packet.

39. The apparatus of claim 34, wherein the processor is configured to perform encryption or integrity protection for the data packet with a first cryptographic key obtained from the first security information, and perform encryption or integrity protection for the data packet with a second cryptographic key obtained from the second security information.

40. The apparatus of claim 34, wherein the processor is configured to perform encryption with one of the first and second security information and perform integrity protection with the other one of the first and second security information.

41. A method comprising:

performing first and second authentications with at least one authentication server, obtaining first and second security information for the first and second authentications, respectively, from an authenticator; and generating a first data packet including a first data packet header, wherein the first data packet header includes the first security information, and to generate a second data packet including a second data packet header and a second data packet payload, wherein the second data packet header includes the second security information and the second data packet payload includes the first data packet.

42. The method of claim 41, wherein the performing the first and second authentications comprises performing the first authentication with a first authentication server, and performing the second authentication with a second authentication server, the second authentication server being different from the first authentication server.

43. The method of claim 41, wherein the generating the data packet comprises securely processing data with the first security information to obtain an initial packet, and securely processing the initial packet with the second security information to obtain the data packet.

44. The method of claim 41, wherein the generating the data packet comprises securely processing data with both the first and second security information to obtain the data packet.

* * * * *